Sept. 16, 1969          H. W. STIER          3,466,720
REVERSIBLE THROW-AWAY CUTTING INSERTS
Filed Nov. 8, 1967          3 Sheets-Sheet 2
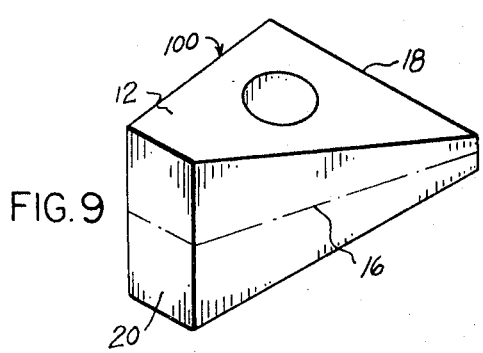
FIG. 9
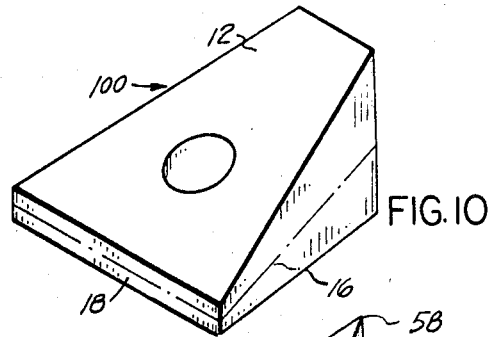
FIG. 10
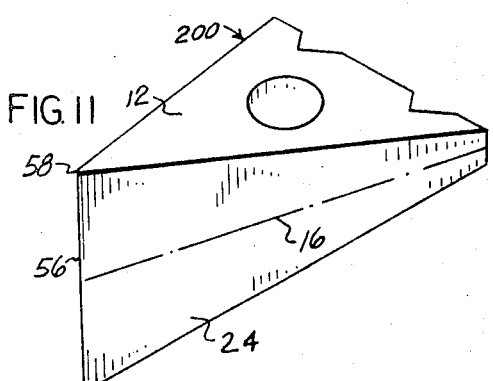
FIG. 11
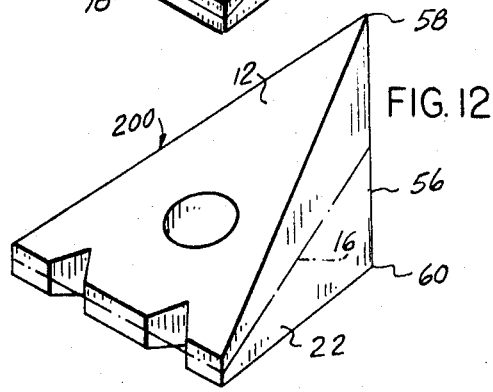
FIG. 12
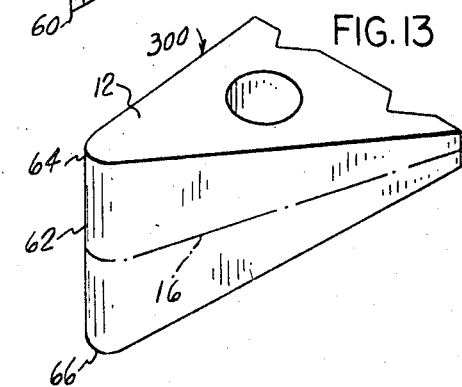
FIG. 13
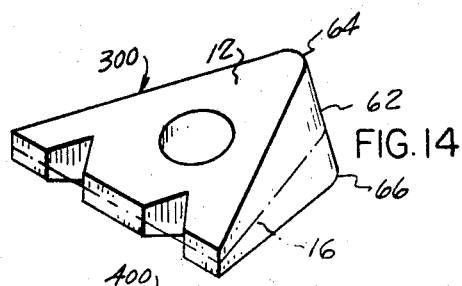
FIG. 14
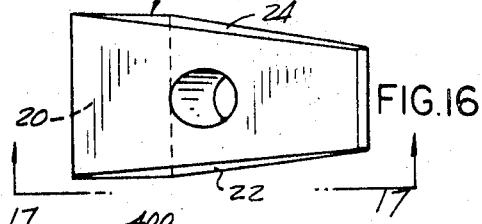
FIG. 16
FIG. 17
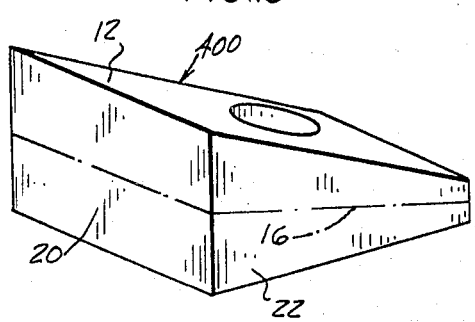
FIG. 15
INVENTOR
HENRY W. STIER
BY *Hauke, Krass, Gifford, & Patalidis*
ATTORNEYS Sept. 16, 1969　　　　　H. W. STIER　　　　　3,466,720
REVERSIBLE THROW-AWAY CUTTING INSERTS
Filed Nov. 8, 1967　　　　　　　　　　　　3 Sheets-Sheet 3
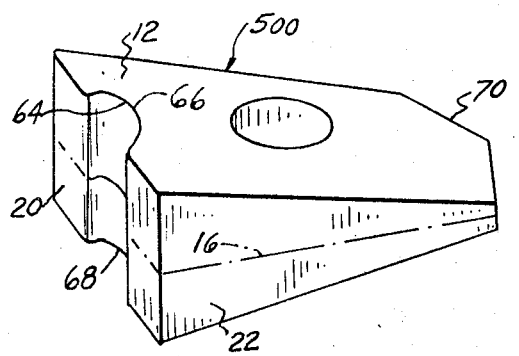
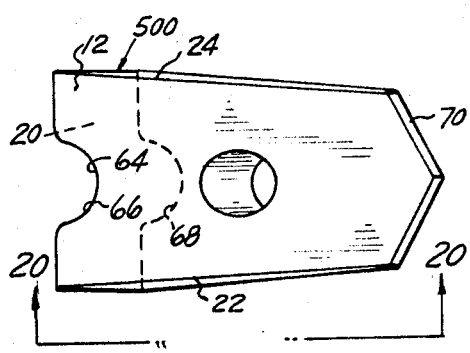
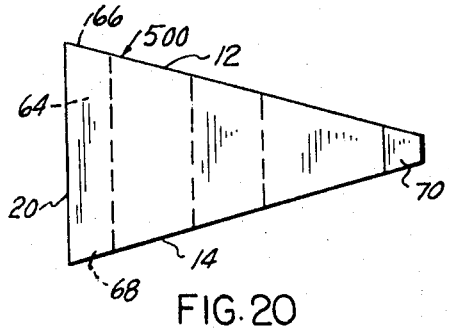
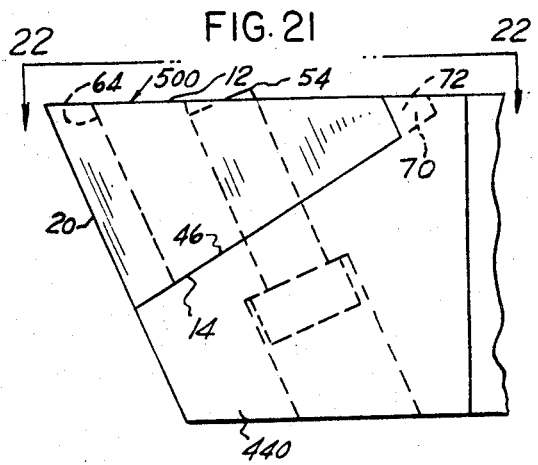
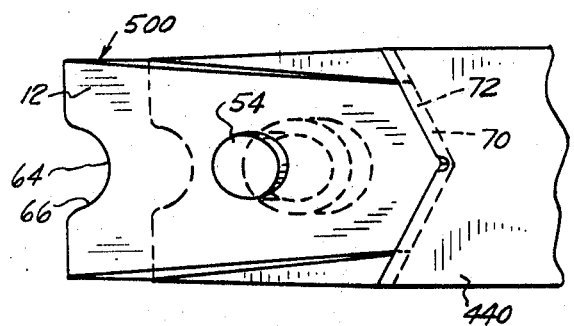
INVENTOR
HENRY W. STIER
ATTORNEYS

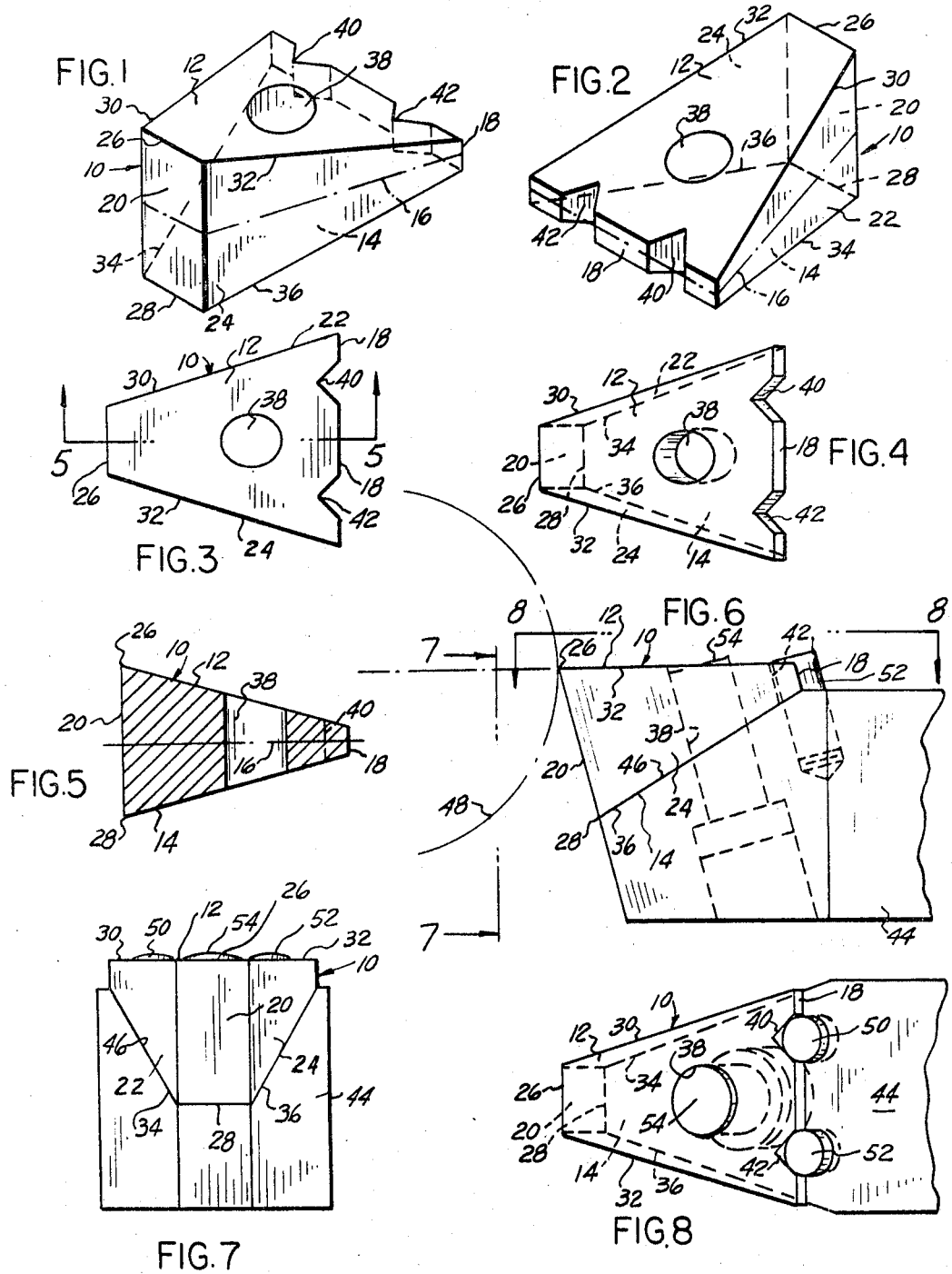

United States Patent Office 3,466,720
Patented Sept. 16, 1969

3,466,720
REVERSIBLE THROW-AWAY CUTTING INSERTS
Henry W. Stier, Dearborn Heights, Mich., assignor to Carmet Company, Pittsburgh, Pa., a corporation of New Jersey
Filed Nov. 8, 1967, Ser. No. 681,433
Int. Cl. B26d 1/00
U.S. Cl. 29—95                                   8 Claims

ABSTRACT OF THE DISCLOSURE

Reversible throw-away cutting inserts for mounting on appropriate tool holder, having symmetrically disposed equal upper and lower faces forwardly diverging from each other.

BACKGROUND OF THE INVENTION

The present invention relates to the field of removable throw-away cutting inserts made of hard materials such as, for example, cemented carbides and the like, and adapted for mounting on a tool holder for effecing a cutting operation on a workpiece. Prior art cutting inserts are generally in the form of a prismatic block having parallel upper and lower faces which form with the side faces of the block, generally normal to the plane of the upper and lower faces, one or more cutting edges for appropriate cutting below the surface of a workpiece and removal of material therefrom, the cutting edge and the workpiece being displaced relatively to each other. When the cutting edge is worn or damaged beyond usefulness, the cutting insert is removed from the tool holder and replaced with a new cutting insert. In the prior art are also found cutting inserts provided with a plurality of cutting edges or points, symmetrically arranged such that when a cutting edge or point is worn or damaged beyond usefulness, the insert may be indexed in its holder so as to present a fresh cutting edge or point to the workpiece. In the prior art are further found cutting inserts which are reversible so that when all the cutting edges or points relatively to a face of the insert are worn beyond usefulness the insert is turned over so that fresh cutting edges or points of the other face of the insert may be disposed in a cutting position.

The invention provides for removable, disposable and reversible cutting inserts or bits for mounting on an appropriate holder, such cutting inserts having generally an upper face and a lower face disposed at an angle with respect to a median plane of symmetry of the insert, the upper and lower faces each forming with the forward face of the insert, which is in a plane perpendicular to the plane of symmetry thereof, a pair of symmetrically disposed cutting edges or tips of less than 90°. When a cutting edge or tip is worn beyond usefulness, the cutting insert is removed from the holder and replaced on the holder in a reversed position with respect to its plane of symmetry, such that a fresh cutting edge or tip may be presented to the workpiece. In view of the angular relative positioning of the upper and lower faces of the insert, as contrasted to conventional cutting inserts having parallel upper and lower faces, and in view of the forward face of the insert forming with the upper and lower face of the insert a cutting edge of less than 90°, appropriate front clearance is automatically provided without requiring the insert to be presented to the workpiece with a negative back rake. Consequently, cutting inserts according to the present invention are capable of cutting a workpiece with any appropriate back rake that is found most convenient for proper rate of material removal from the workpiece and for appropriate surface finish, without any additional grinding of the insert faces being necessary.

The invention therefore relates to throw-away reversible cutting inserts which may be mounted in a tool holder so as to work with no back rake or with a positive back rake, and which, nevertheless, may be removed from the tool holder and turned over for use of a new cutting edge or tip when the first cutting edge or tip is worn or damaged. Cutting inserts according to the principles of the present invention are particularly useful in machine lathe turning of a cylindrical workpiece where it is desired to cut a straight groove or a V-groove on the periphery of the workpiece, or for forming the peripheral surface of a workpiece to a predetermined contour by means of a "form" tool. The multiple objects of the present invention will become apparent when the accompanying description of some of the best modes contemplated for practicing the invention is read in conjunction with the accompanying drawings wherein like numerals refer to like or equivalent parts in the diverse views, and in which:

BRIEF DESCRIPTION OF THE DRAWINGS

FIG. 1 is a perspective view of a reversible throw-away cutting insert according to the present invention;
FIG. 2 is a perspective view of the cutting insert of FIG. 1 as seen from a different angle;
FIG. 3 is a plan elevation view thereof;
FIG. 4 is a plan elevation view thereof with one of the faces thereof in the plane of the drawing;
FIG. 5 is a longitudinal sectional view from line 5—5 of FIG. 3;
FIG. 6 is a side elevation view of the cutting inserts of FIGS. 1-5 mounted on an appropriate tool holder;
FIG. 7 is a front elevation view thereof as seen from line 7—7 of FIG. 6;
FIG. 8 is a top plan view thereof as seen from line 8—8 or FIG. 6;
FIGS. 9 and 10 are views similar to FIGS. 1 and 2, but showing a modification of a cutting insert according to the present invention;
FIGS. 11 and 12 are views similar to FIGS. 9 and 10, but showing a further modification;
FIGS. 13 and 14 are views similar to FIGS. 11 and 12, but showing a further modification;
FIG. 15 is a perspective view of a further modification of a cutting insert according to the present invention;
FIG. 16 is a top plan view of the cutting insert of FIG. 15;
FIG. 17 is a side elevation view thereof as seen from line 17—17 of FIG. 16;
FIG. 18 is a perspective view of another modification of a cutting insert according to the present invention;
FIG. 19 is a top plan view thereof;
FIG. 20 is a side elevation view thereof as seen from line 20—20;
FIG. 21 is a side elevation view of the cutting insert of FIGS. 18-20 mounted on an appropriate tool holder; and
FIG. 22 is a top plan view thereof, as seen from line 22—22 of FIG. 21.

DETAILED DESCRIPTION OF THE PREFERRED EMBODIMENTS

Referring now to FIGS. 1-5 which represent an example of an embodiment of a cutting insert or bit according to the principles of the present invention, the reversible removable cutting insert is made preferably of ultra-hard materials, such as cemented carbides and the like, shaped in the form of a prismatic block 10. The prismatic block 10 is substantially wedge-shaped by being provided with two substantially alike and equal faces 12 and 14, defining respectivey the upper and lower faces of the prismatic block 10 which, as shown in the drawings, are angularly disposed relatively to each other and are symmetrically disposed with respect to a median plane of symmetry of the insert, such median plane of symmetry being shown in phantom lines at 16. It is to be appreciated that the cutting insert formed by the prismatic block 10, as will be hereinafter explained in further detail, is reversible such that the terms "upper" and "lower" faces when used relatively to the invention are relative terms and relate to the orientation of the prismatic block 10 represented in the drawings.

The upper face 12 and the lower face 14 of the wedge-shaped prismatic block 10 are forwardly diverging from each other and are joined at the rear portion of the block by a substantially rectangular rear wall, shown generally at 18, disposed in a plane substantially normal to the median plane of symmetry 16. The forward end of the prismatic block 10 is defined by a forward wall 20, in a plane substantially parallel to the plane of the rear wall 18, therefore in a plane normal to the median plane of symmetry 16 of the prismatic block 10. The prismatic block 10, in the example shown in the drawing, has two symmetrically disposed forwardly converging side faces 22 and 24, each disposed in a plane substantially normal to the median plane of symmetry of the block and to the planes of upper and lower faces 12 and 14. The intersections of the diverse faces of the prismatic block thus form two symmetrically disposed forward cutting edges 26 and 28, two lateral cutting edges 30 and 32 relatively to the upper face 12, and two further lateral cutting edges 32 and 34 relatively to the lower face 14.

In the structural example of cutting inserts according to the present invention shown in FIGS. 1–5, the prismatic block 10 is also further provided with a mounting hole or bore 38, and the rear face 18 thereof has two indexing or locating V-shaped notches, shown at 40 and 42, for the purpose to be hereinafter indicated for ease of mounting on an appropriate tool holder, although it will be appreciated by those skilled in the art that the mounting hole or bore 38 and the V-shaped notches 40 and 42 are not an essential part of a cutting insert configuration according to the present invention and that other means may be used for effectively mounting the prismatic block forming the cutting insert in an appropriate position on a tool holder.

As shown in FIGS. 6–8, the wedge-shaped cutting insert of the invention in the form of prismatic block 10 is mounted on the end of a tool holder 44 having an appropriate support surface 46 adapted to support and locate the prismatic block 10 for appropriate presentation of the cutting edges thereof to a workpiece, such as a cylindrical workpiece mounted in the chuck of a turning lathe, not shown, the outline of such a workpiece being shown at 48 in FIG. 6. The support surface 46 on the end of the tool holder 44 is inclined to an appropriate angle such that when the wedge-shaped insert consisting of prismatic block 10 is mounted on the tool holder, the cutting insert is presented to the workpiece with a back rake angle which may be either positive or negative, according to the conditions under which it is desired to effectuate the cutting operation on the porkpiece, such cutting insert being shown in FIG. 6 under a condition of zero back rake angle. The cutting insert heretofore described is particularly appropriate for plunge cut of a flat bottom V-groove in the workpiece, such as for example plunge cut of the periphery of a V-belt pulley, and it should be noted that the geometry of the insert provides adequate side clearances and adequate front clearance in view of the acute angle formed by the forward cutting edge 26 or 28.

When the cutting insert is worn beyond usefulness, it may be reversed in the holder such that fresh cutting edges and nose are presented to the workpiece. It is also obvious, that if so desired, the cutting edges may be rejuvenated by grinding the surfaces of face 12 or 14 to a depth sufficient to sharpen the junction edges between such faces and the forward and lateral faces 20, 22 and 24.

The arrangement shown for locating and mounting the cutting insert in the form of prismatic block 10 on the tip of tool holder 44 comprises cylindrical locating pins 50 and 52 each projecting from the top of the tool holder at appropriate locations and at the required angle for normally engaging the appropriate V-shaped notch 40 or 42 of the insert, when a mounting pin such as eccentric pin or bolt 54 is displaced from a release position to a locking position whereby, as a result of the frictional engagement of the periphery of the pin or bolt with the inner surface of mounting bore 38 and as a result of the motion of the pin from such release position to locking position, it urges the appropriate face 12 or 14 of the prismatic block in engagement with the support surface 46 of the tool holder while simultaneously urging the prismatic block rearwardly so as to firmly engage the surfaces of the V-notches 40 and 42 with the peripheral surface of locating pins 50 and 52.

FIGS. 9–20 graphically illustrate diverse examples of configurations of wedge-shaped cutting inserts or bits according to the principles of the present invention and adapted for cutting a workpiece to an appropriate contour, preferably by plunge feed of the cutting inserts relatively to a rotating workpiece. As an example of such cutting insert configuration, the cutting insert 100 of FIGS. 9–10 is functionally the full equivalent of the cutting insert or prismatic block 10 of FIGS. 1–8, although cutting insert 100 is provided however with an uninterrupted rear wall 18 devoid of locating V-shaped notches such that cutting insert 100 may be mounted on a more conventional holder than the one illustrated at FIGS. 6–8.

The cutting insert 200 of FIGS. 11–12 is substantially alike the cutting insert or prismatic block 10 of FIGS. 1–8 wherein the side faces 22 and 24 are arranged to converge along an edge 56 substantially normal to the median plane of symmetry 16 of the prismatic block so as to form a pair of symmetrically disposed reversible sharp cutting noses 58 and 60. It is thus obvious that cutting insert 200 is particularly adapted for cutting a sharp bottom V-groove in a rotating workpiece.

The wedge-shaped cutting insert 300 of FIGS. 13–14 is substantially alike the cutting insert 200 of FIGS. 11–12, but is provided with a rounded nose 62 defining rounded cutting tips 64 and 66 so as to be adapted to form a radiused bottom V-groove in a workpiece.

The cutting insert 400 of FIGS. 15–17 is designed for plunge cutting of a straight groove in a workpiece, and is provided with side faces 22 and 24 angularly disposed so as to be slightly diverging towards the front face of the prismatic block for providing appropriate side clearances for the cutting insert.

FIGS. 18–20 represent a further example of configuration for a cutting insert 500 embodying the principles of the present invention. Cutting insert 500 is in the form of a substantially prismatic block having a forward face 20 ground to an appropriate contour, arbitrarily shown at 64, so as to define a pair of symmetrically disposed cutting edges 66 and 68, successively usable, by reversing the insert. The rear face of the cutting insert 500 is shown as being V-shaped, as seen at 70, such that the cutting insert 500 may be mounted on a more conventional tool holder 440 having a pocket on the end thereof defining a support surface 46 for the lower face of the cutting insert and a rear wall 72 adapted to locate the rear face 70 of the insert when the insert is mounted in the pocket on the end of the tool holder and the mounting pin or bolt 54 is displaced from its insert releasing position to its insert locking position. It is obvious that the cutting insert 500 could be provided, alternately, with a rectangular rear wall having locating V-shaped notches for mounting on a tool holder such as tool holder illustrated in FIGS. 6–8, and that alternately, the cutting insert could be provided with an unbroken rear wall disposed in a single plane, as are the inserts of FIGS. 9–10 and FIGS. 15–17, such inserts with a plane rear wall being adapted for mounting on a tool holder substantially alike tool holder 440 of FIGS. 21–22 but provided with a planar back wall in its mounting pocket or recess.

While the invention has been illustrated and described as embodied in diverse configurations of cutting tool inserts or bits, it is not intended to be limited to the details shown, since various modifications and structural changes may be made without departing in any way from the spirit or scope of the present invention.

What is claimed as new and desired to be secured by United States Letters Patent is:

I claim:

1. A reversible wedge-shaped removable cutting insert for a cutting tool, said cutting insert being in the form of a prismatic block having two equal upper and lower faces disposed at an angle with respect to a median plane of symmetry, a substantially rectangular rear face normal to said median plane of symmetry and two side faces each shaped as a regular quadrilater normal to said median plane of symmetry, each of said side face having two parallel unequal sides the smaller of which defines one of the sides of said rear face.

2. The reversible cutting insert of claim 1 further comprising a substantially rectangular front face normal to said median plane of symmetry.

3. The reversible cutting insert of claim 1 wherein said side faces are forwardly converging.

4. The reversible cutting insert of claim 2 wherein said side faces are forwardly converging.

5. The reversible cutting insert of claim 3 wherein said side faces are symmetrically disposed relatively to a centerline of said prismatic block.

6. The reversible cutting insert of claim 4 wherein said side faces are symmetrically disposed relatively to a centerline of said prismatic block.

7. The cutting insert of claim 1 further comprising a pair of identical parallel substantially V-shaped notches formed in the rear face of said prismatic block each for engagement with a locating pin disposed in a holder for said cutting insert.

8. The cutting insert of claim 7 further comprising a bore joining said upper and lower faces and axed subtantially parallely to said notches.

References Cited

UNITED STATES PATENTS

| 1,920,035 | 7/1933 | Stephens | 29—96 X |
| 2,240,404 | 4/1941 | King | 29—96 X |

HARRISON L. HINSON, Primary Examiner